(12) United States Patent
Volovich et al.

(10) Patent No.: US 9,071,881 B2
(45) Date of Patent: *Jun. 30, 2015

(54) IDENTIFYING AN END OF A TELEVISION PROGRAM

(71) Applicant: Google Inc., Mountain View, CA (US)

(72) Inventors: Yaroslav Volovich, Cambridge (GB); Ant Oztaskent, Sutton (GB)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,596

(22) Filed: Dec. 27, 2013

(65) Prior Publication Data

US 2014/0115620 A1    Apr. 24, 2014

Related U.S. Application Data

(63) Continuation of application No. 13/406,448, filed on Feb. 27, 2012, now Pat. No. 8,635,639.

(51) Int. Cl.

| | |
|---|---|
| *H04N 21/488* | (2011.01) |
| *H04N 21/466* | (2011.01) |
| *H04N 21/25* | (2011.01) |
| *H04N 5/76* | (2006.01) |
| *H04H 60/29* | (2008.01) |
| *H04H 60/59* | (2008.01) |
| *H04N 21/234* | (2011.01) |
| *H04N 21/24* | (2011.01) |
| *H04N 21/44* | (2011.01) |
| *H04N 21/442* | (2011.01) |
| *H04H 60/37* | (2008.01) |
| *H04H 60/40* | (2008.01) |
| *H04N 9/82* | (2006.01) |

(52) U.S. Cl.
CPC ....... *H04N 21/4884* (2013.01); *H04N 21/4667* (2013.01); *H04N 21/4662* (2013.01); *H04N 21/25* (2013.01); *H04N 21/466* (2013.01); *H04N 21/251* (2013.01); *H04N 21/252* (2013.01); *H04N 5/76* (2013.01); *H04H 60/29* (2013.01); *H04H 60/59* (2013.01); *H04N 21/23418* (2013.01); *H04N 21/2407* (2013.01); *H04N 21/44008* (2013.01); *H04N 21/44204* (2013.01); *H04H 60/37* (2013.01); *H04H 60/40* (2013.01); *H04N 9/8205* (2013.01)

(58) Field of Classification Search
None
See application file for complete search history.

(56) References Cited

U.S. PATENT DOCUMENTS

2002/0188945 A1* 12/2002 McGee et al. ................ 725/39
2007/0011012 A1* 1/2007 Yurick et al. ................ 704/277

(Continued)

*Primary Examiner* — Justin Shepard
(74) *Attorney, Agent, or Firm* — Morgan, Lewis & Bockius LLP

(57) ABSTRACT

Systems, methods, and non-transitory computer-readable storage mediums storing at least one program for identifying an end of a television program is described. In some implementations, a method comprises: periodically obtaining subtitles for a plurality of television programs during respective predetermined time intervals that include respective times when respective television programs in the plurality of television programs are scheduled to end; identifying sequences of strings from the subtitles for the plurality of television programs in accordance with predefined criteria associated with the plurality of television programs; and updating an aggregation of subtitles indicating that a television program in the plurality of television program has ended, with the identified sequences of strings. In some implementations, the method is implemented at a computing device having at least one processor and memory storing at least one program for execution by the at least one processor.

20 Claims, 8 Drawing Sheets

(56) References Cited

U.S. PATENT DOCUMENTS

| | | |
|---|---|---|
| 2007/0288950 A1 | 12/2007 | Downey et al. |
| 2008/0059999 A1 | 3/2008 | Winans et al. |
| 2009/0138903 A1* | 5/2009 | Blanchard et al. .............. 725/14 |
| 2010/0115557 A1 | 5/2010 | Billmaier et al. |
| 2011/0149153 A1* | 6/2011 | Nam et al. .................... 348/468 |
| 2012/0036537 A1* | 2/2012 | Klappert et al. ................ 725/50 |

* cited by examiner

IDENTIFYING AN END OF A TELEVISION PROGRAM

RELATED APPLICATION

This application is a Continuation of U.S. patent application Ser. No. 13/406,448, filed Feb. 27, 2012, entitled "Identifying an End of a Television Program," which is incorporated by reference herein in its entirety.

TECHNICAL FILED

The disclosed implementations relate generally to identifying an end of a television program.

BACKGROUND

Television programs are scheduled to start and end at predetermined times. However, an actual start of a television program may occur before or after a scheduled start time and an actual end of the television program may occur before or after a scheduled end time. For example, an end of a live television event (e.g., an awards show) may occur at a time that is later than a scheduled ending time. It is desirable to identify an end of a television program so that appropriate actions may be taken.

SUMMARY

Systems, methods, and non-transitory computer-readable storage mediums storing at least one program for identifying an end of a television program is described. In some implementations, a method comprises: periodically obtaining subtitles for a plurality of television programs during respective predetermined time intervals that include respective times when respective television programs in the plurality of television programs are scheduled to end; identifying sequences of strings from the subtitles for the plurality of television programs in accordance with predefined criteria associated with the plurality of television programs; and updating an aggregation of subtitles indicating that a television program in the plurality of television program has ended, with the identified sequences of strings. In some implementations, the method is implemented at a computing device having at least one processor and memory storing at least one program for execution by the at least one processor.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The times when a television program is scheduled to start and end may be obtained from an electronic programming guide (EPG). However, the times when a television program actually starts and ends may be different than the times when the television program is scheduled to start and end. For example, the information in the EPG assumes that the television program does not start until a previous television program ends and the television program does not end until a next television program starts. Thus, a time period in which the television program is scheduled to air includes not only the television program itself, but may also include commercials before and after the actual start and end of the television program. In another example, the television program may start (or end) earlier and/or later than scheduled due to various factors (e.g., the previous television program ends later than scheduled, a news event delays a time when the television program actually starts, the television program is a live event that runs past a time when the television program is scheduled to end, etc.).

Knowing when a television program has ended is useful for several reasons. For example, the end of a television program includes a time when a viewer may start searching for another television program to watch. Thus, the end of the television program is a desirable time to recommend another television program to the viewer. In another example, the end of a television program includes a time when a viewer may search for information related to the television program. Thus, the end of the television program is a desirable time to recommend and/or present content related to the television program to the viewer. In another example, a digital video recorder (DVR) may miss the end of a television program if the television program runs past the scheduled end time. Thus, the DVR may be instructed to extend a scheduled recording of the television program the end of the television program (i.e., the actual end of the television program) has been determined. In another example, a DVR may continue to record a television program until a time when the television program is scheduled to end (e.g., until a time when a next television program is scheduled to start) even though the television program has ended. In other words, the DVR may record the commercials that air in a time period between the actual end of the television program and a time when the next television program is scheduled to start. Thus, a DVR may be instructed to stop recording a television program after the end of the television program has been determined (e.g., to avoid the recording of the commercials that air in the time period between the actual end of the television program and the time when the next television program is scheduled to start).

The implementations described herein provide techniques for identifying an end of a television program.

Figure 1:
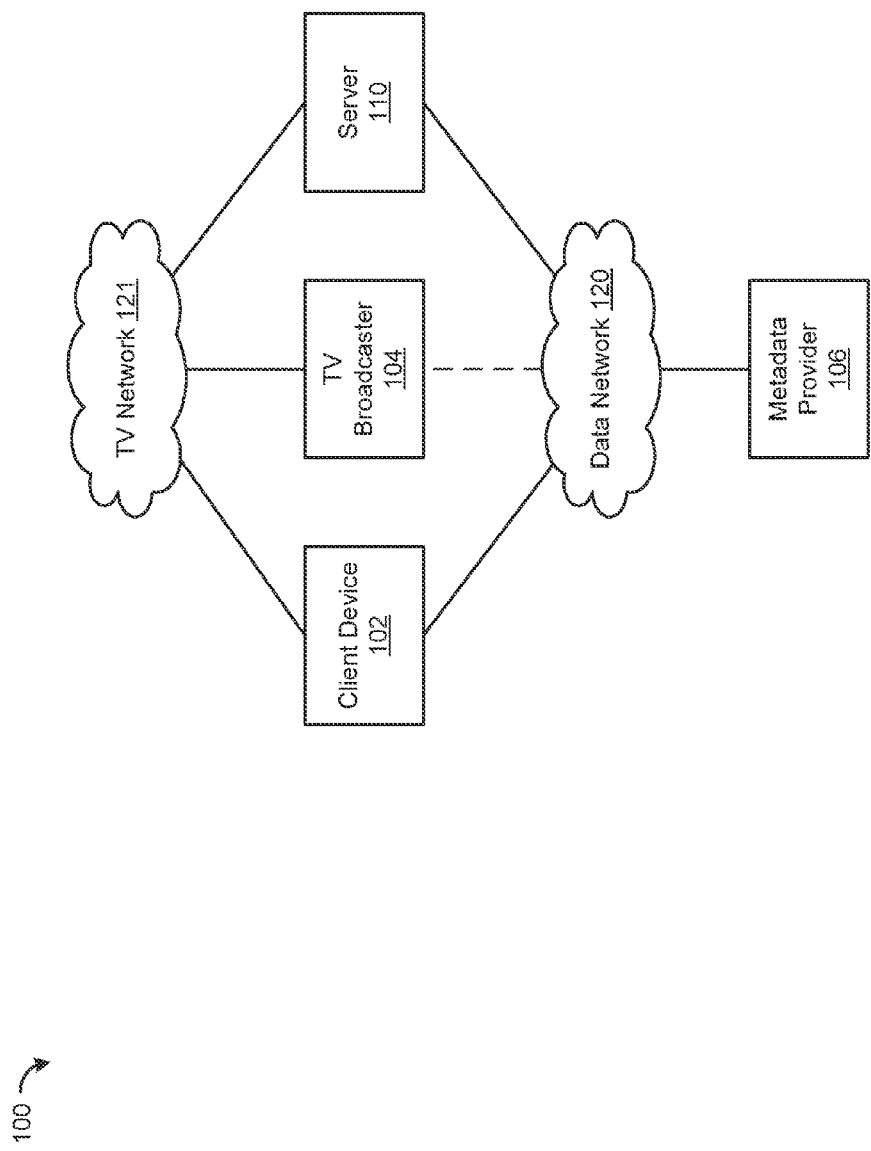
FIG. 1 is a block diagram illustrating an example network system, according to some implementations.

FIG. 1 is a block diagram illustrating a network system 100, according to some implementations. The network system 100 includes a client device 102, a server 110, and a metadata provider 106 coupled to a data network 120. The data network 120 may generally include any type of wired or wireless communication channel capable of coupling together computing nodes. This includes, but is not limited to, a local area network, a wide area network, or a combination of networks. In some embodiments, the data network 120 includes the Internet.

The network system 100 also includes a TV broadcaster 104 that broadcasts television programs through a TV network 121 to the client device 102 and/or the server 110. The TV network 121 may generally include any type of wired or wireless communication channel capable of transmitting television signals. This includes, but is not limited to, an over-the-air television network, a cable television network, a satellite television network. In some implementations, the TV broadcaster 104 broadcasts television programs using the data network 120 (e.g., using an Internet Television protocol).

In some implementations, the television programs broadcast by the TV broadcaster 104 include subtitles. Note that the term "subtitles" refers to a sequence of strings (e.g., text) that is displayed in conjunction with (or associated with) a sequence of video frames of a television program (e.g., the sequence of video frames that includes the respective sequence of strings) and corresponds to dialog being presented during the sequence of video frames. In some implementations, the subtitles are in the same language as the dialog. In some implementations, the subtitles are in a different language than the dialog. The term "subtitles" is also synonymous with the term "closed captioning." For example, a first subtitle "I can't believe you said that" may be displayed in conjunction with a first sequence of video frames of a television program and a second subtitle "What are you talking about?" may be displayed in conjunction with a second sequence of video frames of a television program. In some implementations, the TV broadcaster 104 includes a single television network station, multiple related television network stations (e.g., affiliate television stations, television stations owned by the same entity, etc.), and a television service program (e.g., a cable television service provider, a satellite television service provider, etc.). As discussed above, the TV broadcaster 104 typically broadcasts the television programs using a predetermined broadcast schedule that indicates times when the television programs are scheduled to start and end.

In some implementations, the client device 102 includes a digital video recorder (DVR), a television set top box (e.g., a cable television set top box, a satellite television set top box, an over-the-air television set top box, an Internet Protocol television set top box, etc.), a television metering box, or any other computer system (e.g., laptop, desktop, server, mobile electronic device, smartphone, tablet, etc.) that is configured to present and/or record a television programs.

In some implementations, the server 110 monitors subtitles for television programs to identify sequences of strings in the subtitles that correspond to known sequences of strings in subtitles indicating that the television programs have ended. The server 110 then notifies the client device 102 that the television programs have ended. In some implementations, the server 110 monitors subtitles for television programs to identify sequences of strings indicating that the television program has ended. The server 110 then provides the sequences of strings indicating that the television program has ended to the client device 102 so that the client device 102 can detect and end of the television program. These implementations are described in more detail below.

In some implementations, the metadata provider 106 provides, via data network 120, information relating to television programs to the client device 102 and/or the server 110. In some implementations, a TV broadcaster 104 provides, via the TV network 121, the information relating to television programs to the client device 102 and/or the server 110. The information relating to a respective television program includes, but is not limited to, a title of the respective television program, a synopsis of the respective television program, actors in the respective television program, a respective series to which the respective television program belongs, an episode number for the respective television program, a respective channel on which the respective television program is broadcast, and a scheduled start and end time for the respective television program. In some implementations, the information relating to television programs is included in an electronic program guide (EPG).

Note that although FIG. 1 shows one instance of the server 110, multiple servers may be present in the network system 100. For example, the server 110 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Also note that although the embodiments described herein refer to the client device 102, the TV broadcaster 104, the server 110, and the metadata provider 106, the embodiments may be applied to multiple client devices, TV broadcasters, servers, and metadata providers.

Figure 2:
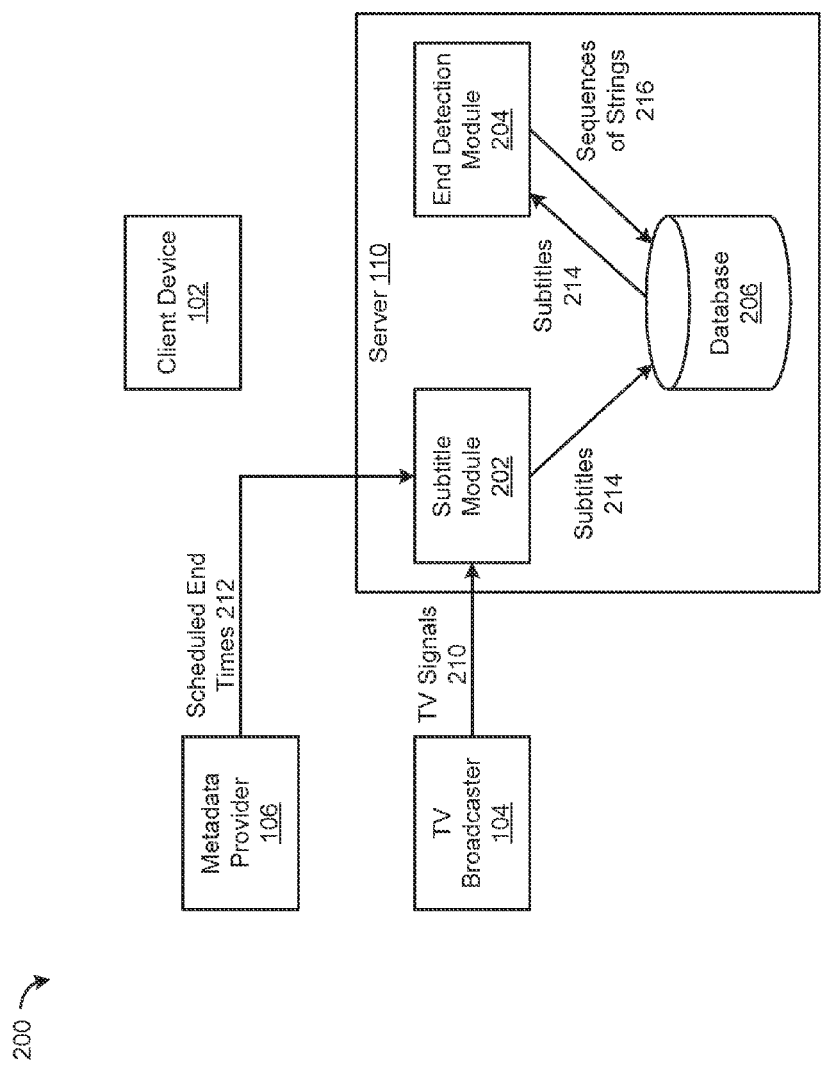
FIG. 2 is a block diagram illustrating an example process of obtaining sequences of strings in subtitles indicating that a television program has ended, according to some implementations.

FIG. 2 is a block diagram 200 illustrating an example process of obtaining sequences of strings in subtitles indicating that a television program has ended, according to some implementations. The TV broadcaster 104 transmits, via the TV network 121 (or the data network 120), TV signals 210 on which a plurality of television programs are broadcast. For example, the TV signals 210 may correspond to TV programs that are currently being broadcast by the TV broadcaster 104. In some implementations, the TV signals 210 include digital TV signals. For example, the digital TV signals may conform to the Digital Video Broadcasting (DVB) standard or the Advanced Television Systems Committee (ATSC) standards. In some implementations, the TV signals 210 include analog TV signals.

In some implementations, the server 110 obtains (and/or captures) a particular television program from a particular TV signal in the TV signals 210 using a TV signal tuning (and/or capture) device that is external to the server 110. In some implementations, the server 110 includes a TV signal tuning (and/or capture) device that obtains (and/or captures) a particular television program from a particular TV signal in the TV signals 210. In some implementations, the TV signal tuning (and/or capture) device obtains a particular television program from a particular carrier frequency in the TV signals 210. In implementations where the TV signals 210 include digital TV signals, the TV signal tuning (and/or capture) device includes a DVB and/or an ATSC TV tuning (and/or capture) device. In implementations where the TV signals 210 include analog TV signals, the TV signal tuning (and/or capture) device includes an analog TV tuning (and/or capture device). In some implementations, the server 110 includes a TV signal tuning (and/or capture) device for each TV signal in the TV signals 210. For example, the server 110 may include a TV signal tuning (and/or capture) device for each carrier frequency on which television programs are broadcast. Note that a particular carrier frequency is typically assigned to a particular TV broadcaster (e.g., a TV station). Furthermore, in some implementations, the particular TV broadcaster is associated with multiple carrier frequencies. For example, the particular TV broadcaster may be associated with a first carrier frequency on an over-the-air TV network, a second carrier frequency on an analog cable TV network, a third carrier frequency on a digital cable TV network, and so on.

A subtitle module 202 of the server 110 receives the TV signals 210 from the TV signal tuning (and/or capture device). In some implementations, the subtitle module 202 receives scheduled end times 212 of the television program from the metadata provider 106. In some implementations, the scheduled end times 212 are included in metadata that is received from the metadata provider 106 (and/or other metadata providers) that is processed and stored in a database 206 (or other database) of the server 110. In these implementations, the scheduled end times 212 are obtained from the database 206 (or other database). In some implementations, the subtitle module 202 obtains subtitles 214 for the television programs corresponding to the TV signals 210 during a predetermined time interval including a time when the television programs are scheduled to end (e.g., scheduled end times 212 that are obtained from the metadata provider 106). For example, the predetermined time interval may include a time interval spanning five minutes before and after a scheduled end of a television program. The subtitles 214 include sequences of strings that correspond to the dialog of the television programs. The subtitles for a particular television signal may be transmitted using several techniques. For the DVB standard, subtitles may be transmitted using two techniques. In the first technique, the subtitles are transmitted as sequences of bitmaps in a private data stream, as specified in European Telecommunications Standards Institute (ETSI) European Standard, telecommunications series (EN) 300 743. For subtitles transmitted using this technique, the subtitle module 202 uses an optical character recognition technique (OCR) to extract the sequences of strings from the sequences of bitmaps. In the second technique, the subtitles are transmitted in text format as teletext subtitles, as specified in ETSI 300 706. For subtitles transmitted using this technique, the subtitle module 202 obtains the sequences of strings from the teletext subtitles. For the ATSC standard, subtitles may be transmitted as Electronic Industries Alliance (EIA) 608 or Consumer Electronics Association (CEA) 708 closed captions inside MPEG-2 user data sections of the MPEG-2 video stream. Since EIA 608 and CEA 708 are text formats, the subtitle module 202 obtains sequences of strings from the user data sections of the MPEG-2 video stream. For analog TV signals in the United States and Canada, subtitles are inserted into line 21 of the non-visible vertical blanking interval (VBI) of the analog video signal, as specified EIA 608. For analog TV signals in Europe, teletext subtitles are inserted into lines 7-22 or 320-335 of the video signal, as specified in ETSI 300 706. Note that the discussion above provides a few example techniques of transmitting subtitles. When other techniques of transmitting subtitles are used, the subtitle module 202 uses the appropriate extraction techniques to obtain the subtitles 214 from the TV signals 210. For example, when the TV signals 210 include Internet Protocol TV signals, the server 110 obtains the TV signals from the servers streaming the Internet Protocol TV signals. The subtitle module 202 then obtains the subtitles 214 from the Internet Protocol TV signals using appropriate techniques.

In some implementations, the subtitle module 202 stores the subtitles 214 (e.g., sequences of strings) in the database 206. In these implementations, a record for a respective subtitle includes a respective sequence of strings for the respective subtitle, a timestamp indicating a time when the respective subtitle was transmitted, optional style information for the respective subtitle (e.g., bold, italics, underline, etc.), optional font information for the respective subtitle, and optional color information for the respective subtitle.

Subtitles at the end of a television program typically include strings that identify the end of the television program. For example, the subtitles at the end of the program may indicate the entity that provided the subtitles (e.g., "NATIONAL CAPTIONING INSTITUTE," "CAPTIONING MADE POSSIBLE BY WARNER BROS. DOMESTIC TELEVISION DISTRIBUTION," etc.). In some implementations, an end detection module 204 of the server 110 obtains the subtitles 214 from the database 206 and identifies sequences of strings 216 that occur in at least a predetermined percentage of the plurality of television programs. For example, the end detection module 204 may identify the sequences of strings 216 as sequences of strings having at least a predetermined minimum length (e.g., five words) and occurring at least the predetermined percentage (e.g., 10%) of subtitles of the plurality of television programs. The sequences of strings 216 that occur in at least the predetermined percentage of the plurality of television programs are likely to be sequences of strings that indicate that a television program has ended. In some implementations, an end detection module 204 of the server 110 obtains the subtitles 214 from the database 206 and identifies sequences of strings 216 that occur in at least a predetermined number of the plurality of television programs during the predetermined time interval including the time when the television programs are scheduled to end. For example, the end detection module 204 may identify the sequences of strings 216 as sequences of strings that occur in the subtitles in the last 10 minutes of at least 15 different television programs. In some implementations, the subtitles 214 that the end detection module 204 obtains from the database 206 only include the subtitles for television programs that were broadcast within a predetermined number of days. For example, the subtitles 214 only include the subtitles for television programs that were broadcast within the past five days. Recall that since the subtitles 214 include the subtitles that were obtained during the predetermined time interval (i.e., the time interval including a time when the television program is scheduled to end), the sequences of strings 216 are also included in the predetermined time interval. The end detection module 204 stores the sequences of strings to the database 206.

In some implementations, the process described above with reference to FIG. 2 is performed continuously for each (or a subset of) the television programs being broadcast by the TV broadcaster 104 (and/or other TV broadcasters). For example, the server 110 may continuously monitor TV signals 310 across all TV broadcasters to obtain the sequences of strings 216 indicating that a television program has ended. In these implementations, the subtitle module 202 obtains subtitles for the television programs corresponding to the TV signals broadcast by the TV broadcasters during the predetermined time interval including the times when the television programs are scheduled to end. The subtitle module 202 stores these subtitles in the database 206. In some implementations, the end detection module 204 periodically obtains the subtitles from the database 206 (e.g., all or a subset of the subtitles that have been collected across a plurality of television programs that have previously been broadcast) and identifies sequences of strings that occur in at least a predetermined percentage of the plurality of television programs. For example, the end detection module 204 may obtain the subtitles from the database 206 and identify sequences of strings that occur in at least a predetermined percentage of the plurality of television programs every two days.

Figure 3:
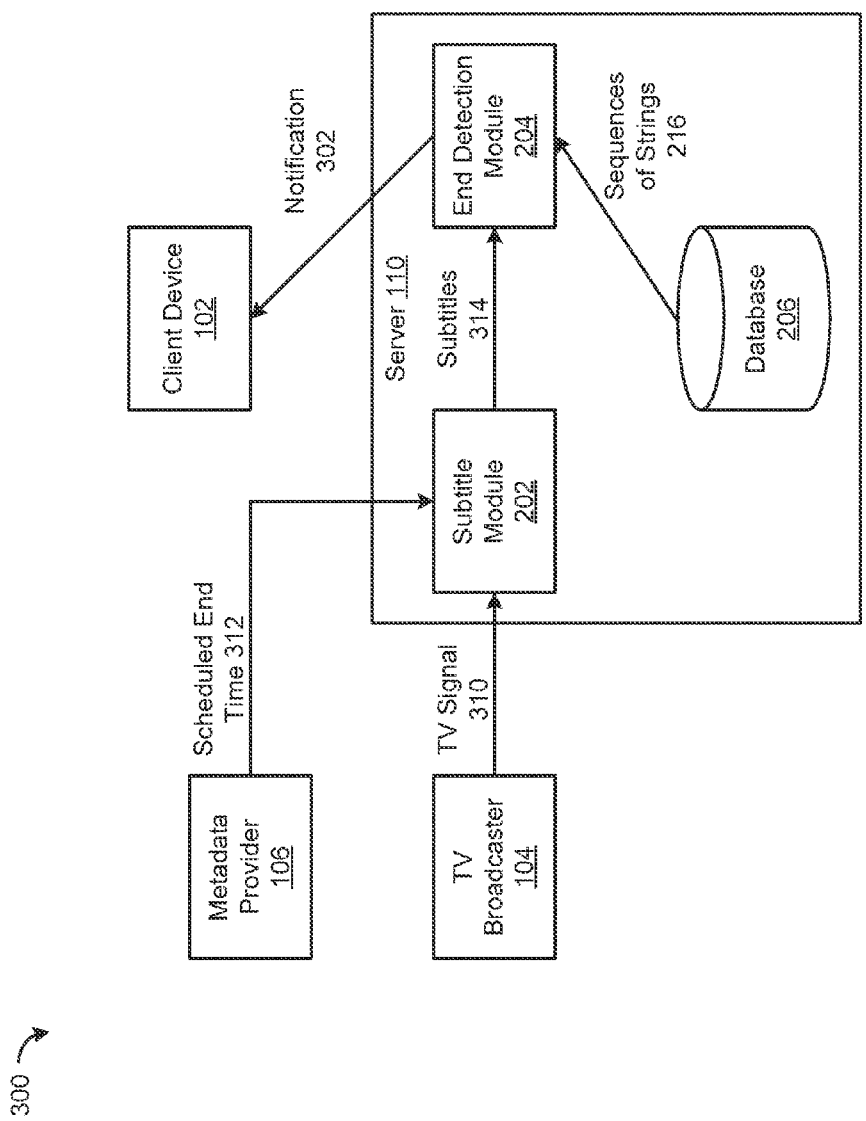
FIG. 3 is a block diagram illustrating an example process of identifying an end of a television program, according to some implementations.

In some implementations, after identifying the sequences of strings 216, the server 110 uses the identified sequence of strings to identify an end of a television program that is currently being broadcast by the TV broadcaster 104. FIG. 3 is a block diagram 300 illustrating an example process of identifying an end of a television program, according to some implementations. A TV signal tuning (and/or capture) device of the server 110 obtains (and/or captures) a TV signal 310 corresponding to a television program. The subtitle module 202 of the server 110 receives the TV signals 310 from the TV signal tuning (and/or capture device). In some implementations, the subtitle module 202 receives a scheduled end time 312 of the television program from the metadata provider 106. In some implementations, the scheduled end time 312 is included in metadata that is received from the metadata provider 106 (and/or other metadata providers) that is processed and stored in the database 206 (or other database) of the server 110. In these implementations, the scheduled end time 312 is obtained from the database 206 (or other database). The subtitle module 202 then obtains subtitles 314 for the television programs corresponding to the TV signals 210 during a predetermined time interval including a time when the television programs are scheduled to end (e.g., scheduled end times 212 that are obtained from the metadata provider 106). The end detection module 204 compares sequences of strings in the subtitles 314 to the sequences of strings 216 indicating that a television program has ended to identify an end of the television program.

In some implementations, after identifying the end of the television program, the end detection module 204 transmits a notification 302 to the client device 102 indicating that the television program has ended. The client device 102 then performs an appropriate action. For example, the client device 102 may stop recording the television program. In another example, the client device may obtain and present information relating to the television program.

In some implementations, the process discussed with reference to FIG. 2 is performed in parallel with the process discussed with reference to FIG. 3. In other words, while the server 110 is identifying an end of a particular television program (e.g., the process described with reference to FIG. 3), the server 110 is also identifying (adding, or refining) the sequences of strings 216 indicating that a television program has ended (e.g., the process described with reference to FIG. 2).

Figure 4:
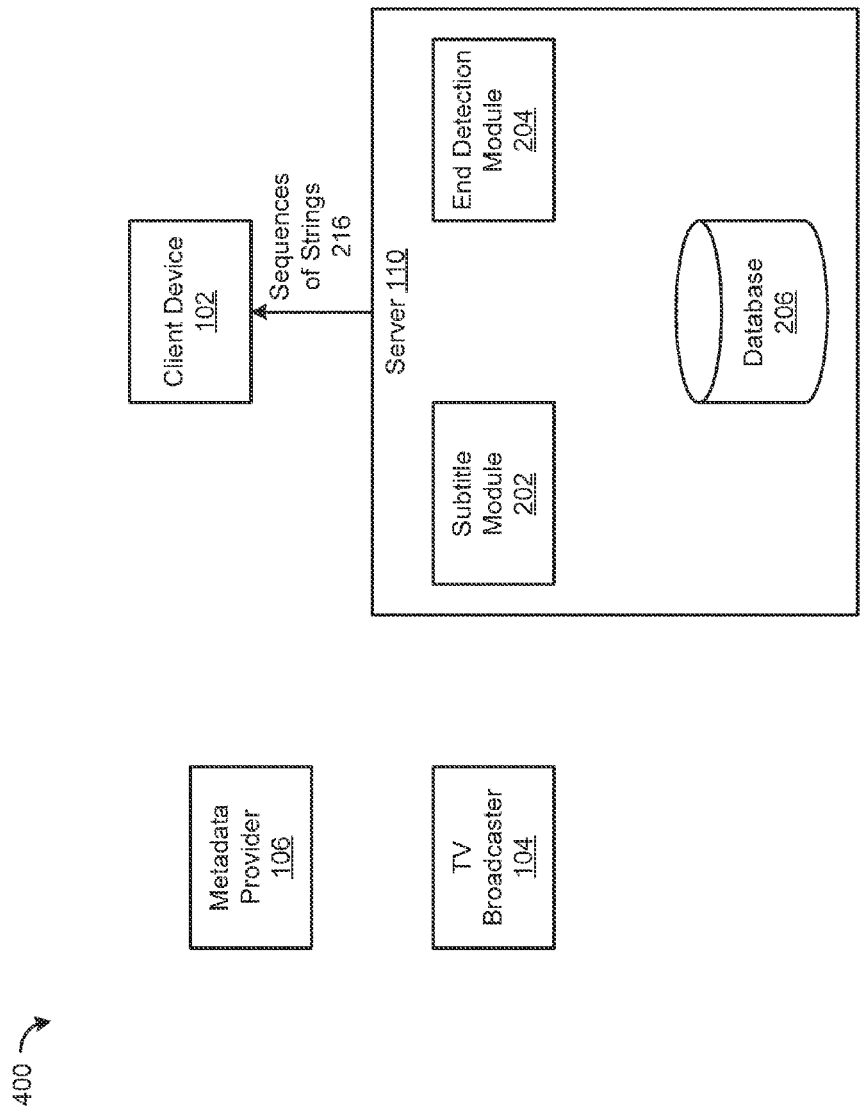
FIG. 4 is a block diagram illustrating an example process of providing sequences of strings in subtitles indicating that a television program has ended to a client device, according to some implementations.

In the process discussed with reference to FIG. 3, the server 110 identifies an end of a television program. In some implementations, the client device 102 performs the operations discussed with reference to FIG. 3. In these implementations, the server 110 provides the sequences of strings 216 to the client device 102 (periodically and/or when the sequences of strings 216 are updated), as illustrated in FIG. 4, so that the client device 102 can identify the end of television programs as discussed with reference to FIG. 3. In some implementations, the server 110 provides the client device 102 with access to the database 206 so that the client device 102 can use the sequences of strings 216 to identify the end of television programs as discussed with reference to FIG. 3.

Figure 5:
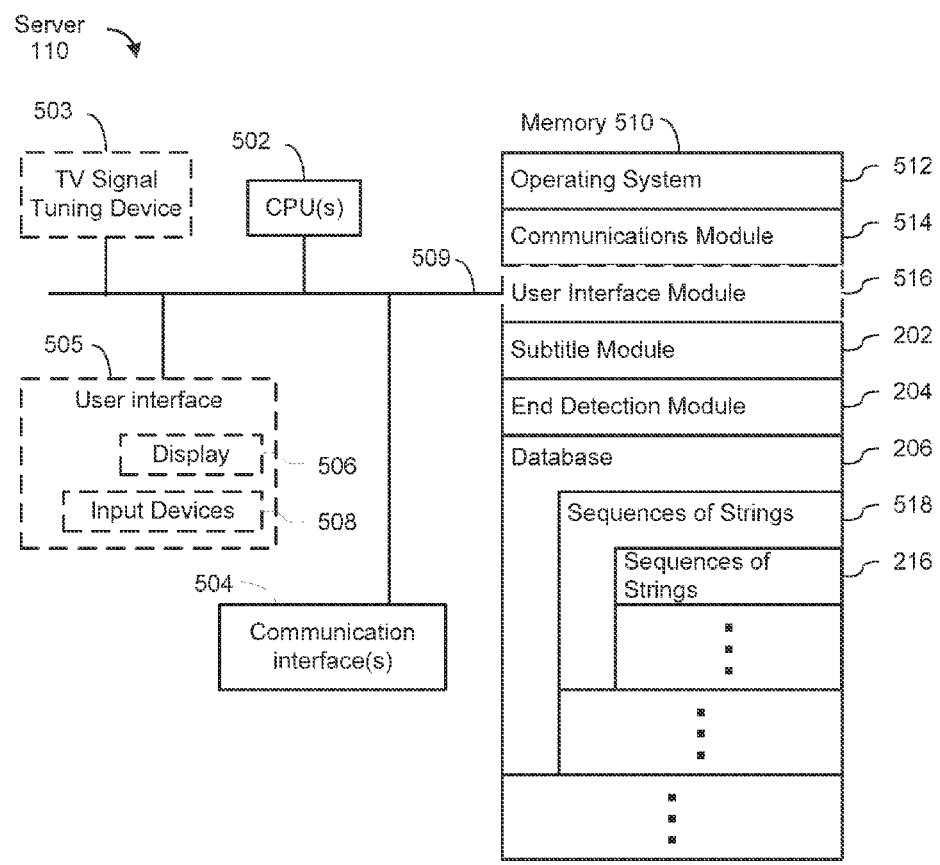
FIG. 5 is a block diagram illustrating an example server, according to some implementations.

FIG. 5 is a block diagram illustrating the server 110, according to some implementations. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The server 110 also includes a TV signal tuning device 503 that obtains (and/or captures) television programs from TV signals. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some implementations, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the server 110 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- the subtitle module 202 that obtains subtitles for television programs during a predetermined time interval including a time when the television programs are scheduled to end, as described herein;
- the end detection module 204 that identifies sequences of strings indicating that a television program has ended and that identifies an end of a television program, as described herein; and
- the database 206, which includes sequences of strings 518 indicating that a television program has ended, where the sequences of strings 518 include the sequences of strings 216, as described herein.

In some implementations, the programs or modules identified above correspond to sets instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various implementations. In some implementations, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the server 110 and how features are allocated among them will vary from one implementation to another, and may depend in part on the amount of data traffic that the system must handle during peak usage periods as well as during average usage periods.

Figure 6:
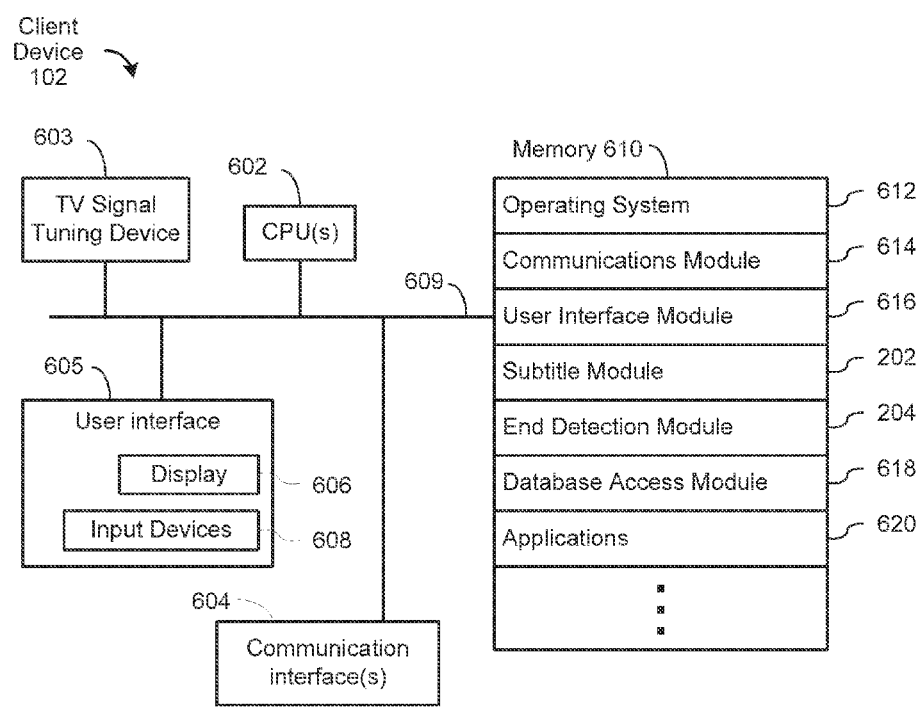
FIG. 6 is a block diagram illustrating an example client device, according to some implementations.

FIG. 6 is a block diagram illustrating the client device 102, according to some implementations. The client device 102 typically includes one or more processing units (CPU's, sometimes called processors) 602 for executing programs (e.g., programs stored in memory 610), one or more network or other communications interfaces 604, memory 610, the input device port 302, the control devices 303, the input ports 304, the output ports 305, and one or more communication buses 609 for interconnecting these components. The server 110 also includes a TV signal tuning device that obtains (and/or captures) television programs from TV signals. The client device 102 also includes a TV signal tuning device 603 that obtains (and/or captures) television programs from TV signals. The communication buses 609 may include circuitry (sometimes called a chipset) that interconnects and controls communications between system components. Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some implementations, memory 610 or the computer readable storage medium of memory 610 stores the following programs, modules and data structures, or a subset thereof:
- an operating system 612 that includes procedures for handling various basic system services and for performing hardware dependent tasks;
- a communication module 614 that is used for connecting the client device 102 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects on the display device 608; and
- the subtitle module 202 that obtains subtitles for television programs during a predetermined time interval including a time when the television programs are scheduled to end, as described herein;
- the end detection module 204 that identifies sequences of strings indicating that a television program has ended and that identifies an end of a television program, as described herein; and
- a database access module 618 that provides an interface for the client device 102 to access (e.g., select, create, update, delete, etc.) a database (e.g., the database 206 of the server 110); and applications 620 that provide additional functionality to the client device 102 (e.g., a web browser, television application, etc.).

In some implementations, the programs or modules identified above correspond to sets instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Although FIG. 6 shows a "client device," FIG. 6 is intended more as functional description of the various features which may be present in a client device than as a structural schematic of the implementations described herein. In practice, and as recognized by those of ordinary skill in the art, items shown separately could be combined and some items could be separated.

Identifying an End of a Television Program

The following discussion refers to the subtitle module 202 and the end detection module 204 of the server 110 performing particular operations. However, the operations discussed below may be performed by other modules of the server 110. Furthermore, the functionality of the subtitle module 202 and the end detection module 204 may be combined into a single module or may be partitioned further into sub-modules (or multiple modules).

Figure 7:
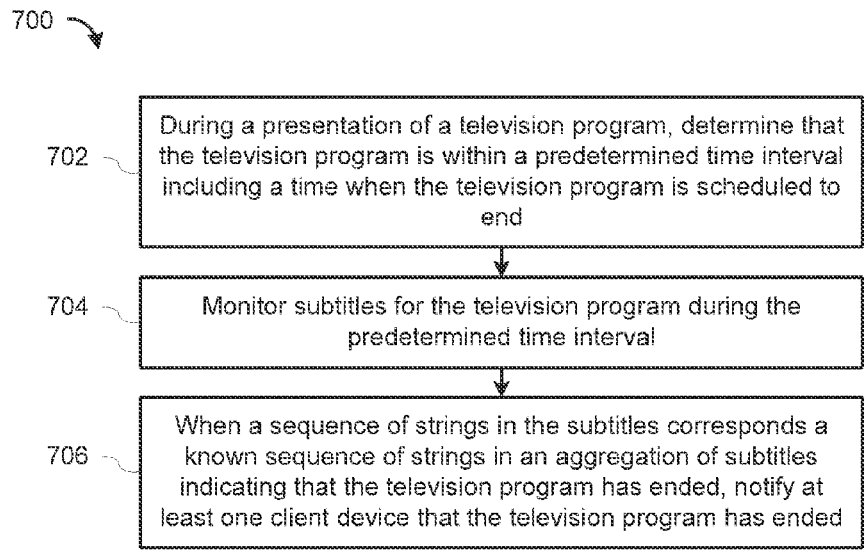
FIG. 7 is a flowchart of a method for identifying an end of a television program, according to some implementations.

FIG. 7 is a flowchart of a method for identifying an end of a television program, according to some implementations. During a scheduled presentation of a television program, the end detection module 204 determines (702) that the television program is within a predetermined time interval including a time when the television program is scheduled to end. The end detection module 204 monitors (704) subtitles for the television program during the predetermined time interval. Operation 704 is described in more detail below with reference to FIG. 8. When a sequence of strings in the subtitles corresponds to a known sequence of strings in an aggregation of subtitles indicating that the television program has ended, the end detection module 204 notifies (706) at least one client device (e.g., the client device 102) that the television program has ended.

Figure 8:
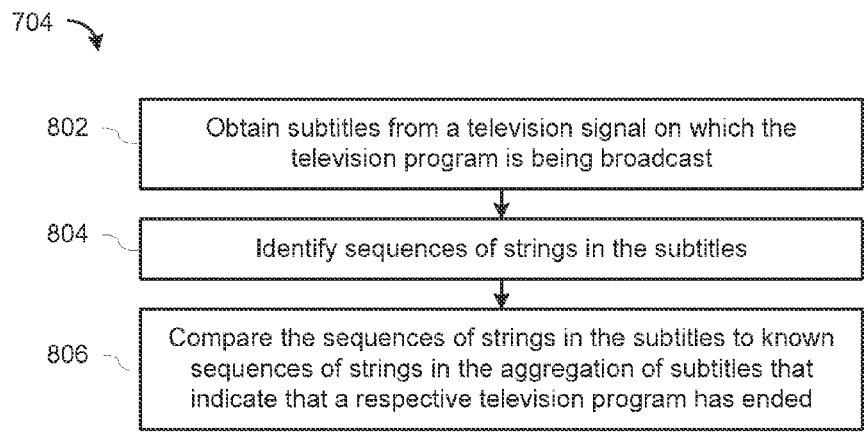
FIG. 8 is a flowchart of a method for monitoring subtitles for a television program during a predetermined time interval, according to some implementations.

FIG. 8 is a flowchart of a method for monitoring (704) subtitles for a television program during a predetermined time interval, according to some implementations. The end detection module 204 obtains (802) subtitles (e.g., the subtitles 314) from a television signal on which the television program is being broadcast, identifies (804) sequences of strings in the subtitles, and compares (806) the sequences of strings in the subtitles to known sequences of strings in the aggregation of subtitles that indicate that a respective television program has ended (e.g., the sequences of strings 216).

In some implementations, the subtitles for the television program are included in a text stream of the television signal. In these implementations, the end detection module 204 obtains the subtitles from the television signal from the subtitle module 202. Specifically, the subtitle module 202 extracts the subtitles from the text stream and provides the extracted subtitles to the end detection module 204.

Figure 9:
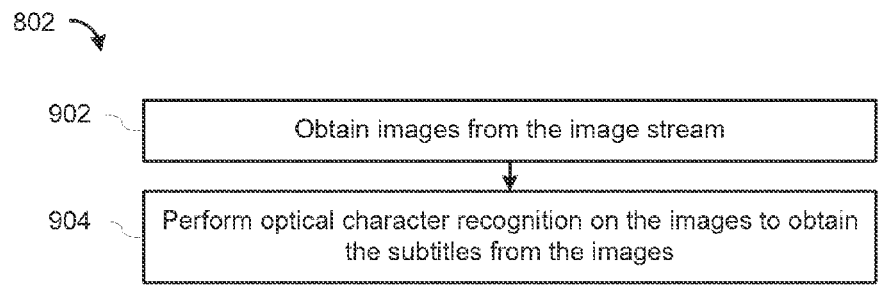
FIG. 9 is a flowchart of a method for obtaining subtitles from a television signal, according to some implementations.

In some implementations, the subtitles for the television program are included in an image stream of the television signal (e.g., a sequence of bitmaps as specified in ETSI EN 300 743, an analog video signal, etc.). FIG. 9 is a flowchart of a method for obtaining (802) subtitles from a television signal, according to some implementations. The subtitle module 202 obtains (902) images from the image stream and performs (904) optical character recognition on the images to obtain the subtitles from the images. The subtitle module 202 then provides the subtitles to the end detection module 204.

In some implementations, the known sequence of strings (e.g., the sequence of strings 216) in the aggregation of subtitles is stored in a database (e.g., the database 206).

Figure 10:
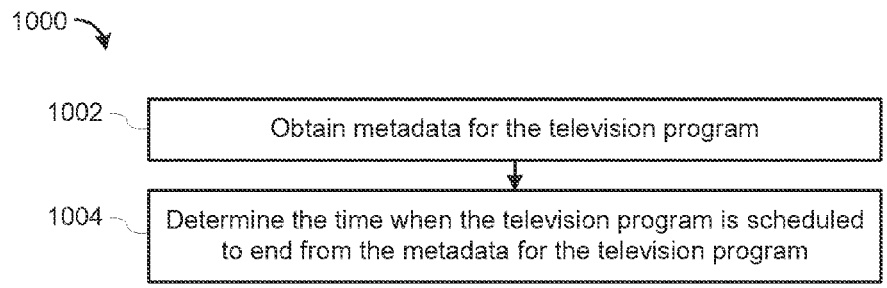
FIG. 10 is a flowchart of a method for determining a time when a television program is scheduled to end, according to some implementations.

Prior determining (702) that the television program is within a predetermined time interval including the time when the television program is scheduled to end, the end detection module 204 determines a time when the television program is scheduled to end, as illustrated in FIG. 10. The end detection module 204 obtains (1002) metadata for the television program and determines (1004) the time when the television program is scheduled to end from the metadata for the television program.

Figure 11:
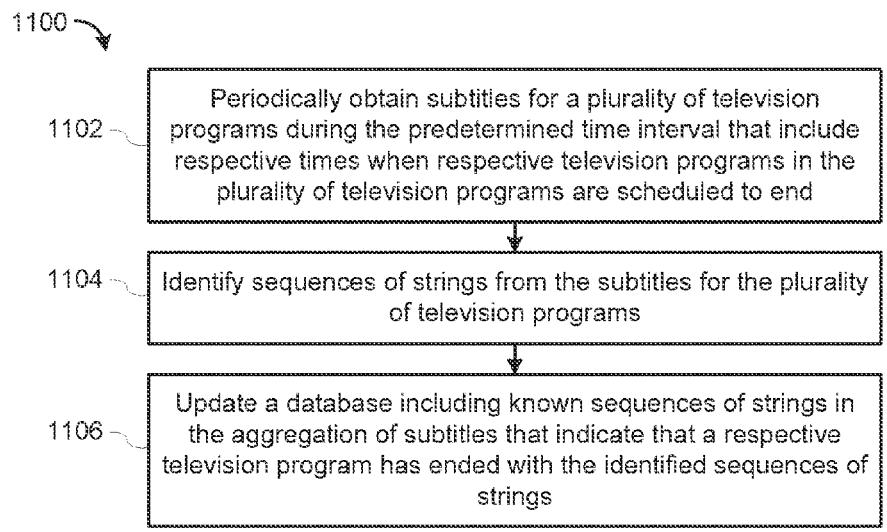
FIG. 11 is a flowchart of a method for identifying sequences of strings in the subtitles indicating that the television program has ended, according to some implementations.

As discussed above, the end detection module 204 identifies (e.g., periodically identifies) sequences of strings indicating that a television program has ended. FIG. 11 is a flowchart of a method for identifying sequences of strings in the subtitles indicating that the television program has ended, according to some implementations.

The end detection module 204 periodically obtains (1102) subtitles for a plurality of television programs during the predetermined time interval that include respective times when respective television programs in the plurality of television programs are scheduled to end. For example, the predetermined time interval may include a time period m minutes before and n minutes after a time that the television program is scheduled to end. In some implementations, the plurality of television programs only includes television programs that were broadcast within a predetermined number of days. For example, the plurality of television programs may include television programs that were broadcast within the past five days. In some implementations, the end detection module 204 identifies (1104) sequences of strings (e.g., the sequences of strings 216) from the subtitles for the plurality of television programs that occur in at least a predetermined percentage of the plurality of television programs (during the predetermined time interval that include respective times when respective television programs in the plurality of television programs are scheduled to end). In some implementations, the end detection module 204 of the server 110 identifies (1104) sequences of strings (e.g., the sequences of strings 216) from the subtitles for the plurality of television programs that occur in at least a predetermined number of the plurality of television programs (during the predetermined time interval that include respective times when respective television programs in the plurality of television programs are scheduled to end). The end detection module 204 then updates (1106) a database (e.g., the database 206) including known sequences of strings in the aggregation of subtitles that indicate that a respective television program has ended with the identified sequences of strings.

In some implementations, instead of updating the database with the identified sequences of strings, the end detection module 204 updates the database with hash values of the identified sequences of strings. In some implementations, the hash values are obtained by applying a hash function (e.g., MD5, SHA1, etc.) to the identified sequences of strings. In these implementations, in operation 806, the end detection module 204 (of the server 110 or the client device 102) compares hash values corresponding to the sequences of strings in the subtitles to hash values corresponding to the known sequences of strings in the aggregation of subtitles that indicate that a respective television program has ended.

In some implementations, the client device 102 performs the operations described above with reference to FIGS. 7-10. In these implementations, the server 110 provides, to the client device 102, the sequences of strings indicating that a television program has ended. For example, the server 110 may periodically transmit the sequences of strings 216 to the client device 102. In another example, the server 110 provides the client device 102 with access to the database 206 so that the client device 102 can obtain the sequences of strings 216. In some implementations, the client device 102 stores a local copy of the sequences of strings 216 in a database of the client device 102.

The methods illustrated in FIGS. 7-11 may be governed by instructions that are stored in a computer readable storage medium and that are executed by at least one processor of at least computer system (e.g., the server 110, the client device 102). Each of the operations shown in FIGS. 7-11 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
    at a computing device having at least one processor and memory storing at least one program for execution by the at least one processor,
    periodically obtaining subtitles for a plurality of television programs during respective predetermined time intervals proximate to and including respective times when respective television programs in the plurality of television programs are scheduled to end;
    identifying sequences of strings from the subtitles for the plurality of television programs that satisfy predefined criteria associated with the plurality of television programs, wherein the predefined criteria include a threshold percentage of the plurality of television programs in which any of the sequences occurs at the end of the programs; and
    updating an aggregation of subtitles indicating that a television program in the plurality of television programs has ended, with the identified sequences of strings.

2. The method of claim 1, wherein obtaining the subtitles for the plurality of television programs during the respective predetermined time interval includes:
    obtaining subtitles from a television signal on which a television program in the plurality of television program is being broadcast; and
    identifying sequences of strings in the subtitles.

3. The method of claim 2, wherein a subtitle in the television programs is included in an image stream of the television signal, and wherein obtaining the subtitle includes:
    obtaining images from the image stream; and
    performing optical character recognition on the images to obtain the subtitle from the images.

4. The method of claim 2, wherein a subtitle in the television programs is included in a text stream of the television signal, and obtaining the subtitles from the television signal includes: extracting the subtitle from the text stream.

5. The method of claim 1, wherein the respective predetermined time intervals that include respective times when respective television programs in the plurality of television programs are scheduled to end are identified by:
    obtaining metadata for the respective television programs; and
    determining the time when the respective television programs are scheduled to end in accordance with the metadata for the respective television programs.

6. The method of claim 1, further comprising: notifying at least one electronic device that the television program has ended.

7. The method of claim 6, wherein the at least one client device includes a set top box.

8. The method of claim 6, wherein the at least one client device includes television set.

9. The method of claim 6, wherein the at least one client device includes computer system.

10. The method of claim 1, wherein the aggregation of subtitles can be used to determine an end of another television program including one of the identified sequences.

11. A system to identify an end of a television program, comprising:
    at least one processor;
    memory; and
    at least one program stored in the memory and executable by the at least one processor, the at least one program comprising instructions for:
        periodically obtaining subtitles for a plurality of television programs during respective predetermined time intervals proximate to and including respective times when respective television programs in the plurality of television programs are scheduled to end;
        identifying sequences of strings from the subtitles for the plurality of television programs that satisfy predefined criteria associated with the plurality of television programs, wherein the predefined criteria include a threshold percentage of the plurality of television programs in which any of the sequences occurs at the end of the programs; and
        updating an aggregation of subtitles indicating that a television program in the plurality of television programs has ended, with the identified sequences of strings.

12. The system of claim 11, wherein obtaining the subtitles for the plurality of television programs during the respective predetermined time interval includes:
    obtaining subtitles from a television signal on which a television program in the plurality of television program is being broadcast; and
    identifying sequences of strings in the subtitles.

13. The system of claim 12, wherein a subtitle in the television programs is included in an image stream of the television signal, and wherein obtaining the subtitle includes:
    obtaining images from the image stream; and
    performing optical character recognition on the images to obtain the subtitle from the images.

14. The system of claim 12, wherein a subtitle in the television programs is included in a text stream of the television signal, and obtaining the subtitles from the television signal includes: extracting the subtitle from the text stream.

15. The system of claim 11, wherein the respective predetermined time intervals that include respective times when respective television programs in the plurality of television programs are scheduled to end are identified by:
 obtaining metadata for the respective television programs; and
 determining the time when the respective television programs are scheduled to end in accordance with the metadata for the respective television programs.

16. The system of claim 12, wherein the one or more programs further comprise instructions for: notifying at least one electronic device that the television program has ended.

17. A non-transitory computer readable storage medium storing at least one program configured for execution by at least one processor of a computing device, the at least one program comprising instructions for:
 periodically obtaining subtitles for a plurality of television programs during respective predetermined time intervals proximate to and including respective times when respective television programs in the plurality of television programs are scheduled to end;
 identifying sequences of strings from the subtitles for the plurality of television programs that satisfy predefined criteria associated with the plurality of television programs, wherein the predefined criteria include a threshold percentage of the plurality of television programs in which any of the sequences occurs at the end of the programs; and
 updating an aggregation of subtitles indicating that a television program in the plurality of television programs has ended, with the identified sequences of strings.

18. The non-transitory computer readable storage medium of claim 17, wherein obtaining the subtitles for the plurality of television programs during the respective predetermined time interval includes:
 obtaining subtitles from a television signal on which a television program in the plurality of television program is being broadcast; and
 identifying sequences of strings in the subtitles.

19. The non-transitory computer readable storage medium of claim 18, wherein a subtitle in the television programs is included in an image stream of the television signal, and wherein obtaining the subtitle includes:
 obtaining images from the image stream; and
 performing optical character recognition on the images to obtain the subtitle from the images.

20. The non-transitory computer readable storage medium of claim 17, wherein the respective predetermined time intervals that include respective times when respective television programs in the plurality of television programs are scheduled to end are identified by:
 obtaining metadata for the respective television programs; and
 determining the time when the respective television programs are scheduled to end in accordance with the metadata for the respective television programs.

* * * * *

UNITED STATES PATENT AND TRADEMARK OFFICE
CERTIFICATE OF CORRECTION

PATENT NO. : 9,071,881 B2  
APPLICATION NO. : 14/142596  
DATED : June 30, 2015  
INVENTOR(S) : Volovich et al.

Page 1 of 1

It is certified that error appears in the above-identified patent and that said Letters Patent is hereby corrected as shown below:

In the claims,

Claim 2, col. 13, line 65, please delete "of television program" and insert --of television programs--;

Claim 12, col. 14, line 59, please delete "of television program" and insert --of television programs--;

Claim 18, col. 16, line 9, please delete "of television program" and insert --of television programs--.

Signed and Sealed this  
Seventeenth Day of November, 2015

Michelle K. Lee  
*Director of the United States Patent and Trademark Office*